United States Patent [19]

Neyenhuys

[11] 4,189,823
[45] Feb. 26, 1980

[54] METHOD AND APPARATUS FOR ASSEMBLING REELS

[76] Inventor: Theodoor Neyenhuys, P.O. Box 3627, Visalia, Calif. 93277

[21] Appl. No.: 910,650

[22] Filed: May 30, 1978

[51] Int. Cl.² .................. B23P 19/04; B23Q 3/00
[52] U.S. Cl. .......................... 29/464; 147/3; 242/117; 242/118.6; 29/526 R
[58] Field of Search ............ 29/281.1, 526 R, 464, 29/281.5; 147/3; 242/117, 115, 116, 118.6, 118.61, 118.62; 113/116 D

[56] References Cited

U.S. PATENT DOCUMENTS

| 101,242 | 3/1870 | Elliott | 147/3 |
|---|---|---|---|
| 180,815 | 8/1876 | Healey | 147/3 |
| 553,301 | 1/1896 | Carroll | 147/3 |
| 1,861,293 | 5/1932 | Bartlett | 147/3 |

Primary Examiner—Gary L. Smith
Assistant Examiner—Roscoe V. Parker, Jr.
Attorney, Agent, or Firm—Huebner & Worrel

[57] ABSTRACT

A method and apparatus for assembling a reel having a pair of axially spaced circular flanges provided with facing annular grooves, a plurality of axially extending staves fitted into the grooves to form a cylindrical drum extending coaxially between the flanges, and a plurality of tie rods extending axially through the flanges within the drum to draw the flanges together, the apparatus having an inner ring assembly removably supported on the rods concentrically within the drum; an outer ring assembly releasably supported on and downwardly of the inner ring assembly concentrically therewith and adapted to open circumferentially so as to be removed from the drum; and a plurality of lances releasably engaging the tie rods for threading the rods through one of the flanges.

13 Claims, 10 Drawing Figures

4,189,823

METHOD AND APPARATUS FOR ASSEMBLING REELS

BACKGROUND OF THE INVENTION

1. Field of the Invention

The present invention relates to a method and apparatus for assembling reels, and more particularly to such an apparatus for assembling reels or the like having a central drum constructed of staves and opposite circular flanges secured on the drum by tie rods, the apparatus being portable and adapted for use at any location where one of the flanges can be supported on a substantially horizontal surface.

2. Description of the Prior Art

Wooden reels of the type described are commonly used for storing and shipping wire rope, telephone cables, electrical cables and the like. At present, these reels are assembled by suppliers outside the cable industry and then shipped to the cable plant where they are wound with the cable. Present methods of assembling these reels involve complex machinery and/or lifting of the reels, which are relatively heavy in the larger sizes. These methods are too expensive and inconvenient for use in cable plants and are even less suited for use in the field. Thus, reels are almost always shipped and stored in their notoriously cumbersome, bulky, space consuming assembly.

The reels have a much greater bulk in their assembled condition than in their unassembled condition. As a result, the expense of shipment is unduly high in the assembled condition. Although the reels are relatively expensive, the unduly high cost of shipping assembled reels makes it uneconomical to return empty reels to a cable plant for reuse. Therefore, the reels normally can be used only once. The bulk of the assembled reels makes indoor storage of the reels expensive, but they only rarely can be stored outdoors due to damage from the weather.

These problems exist although the reels are relatively easy to disassemble and are known to be economical to ship and store after disassembly. However, prior to the subject invention, such shipment and storage were not practical because there existed no sufficiently convenient, economical or practical method or apparatus for reassembly.

The cost of using such reels and the difficulties of reuse are further increased by the impracticability of replacing broken portions of reels so that usually the entire reel must be discarded when damaged. In particular, a flange of the reel is often broken by dropping the reel. When such breakage occurs, not only is the reel lost to further use but it is usually impractical to remove cable from it and it is the conventional practice to destroy the cable too. The cable is frequently of great value and the destruction of cable because of a damaged reel on which it is wound is a major expense to the industry.

PRIOR ART STATEMENT

Characterizing the closest prior art of which the applicant is aware and in compliance with 37 CFR 1.97 and 1.98, attention is invited to U.S. Pat. No. 553,301, issued to Carroll on Jan. 21, 1896, a copy of which is enclosed. This patent is thought to be relevant in its disclosure of a method for assembling staves in a vertical position about an expandable circular member. It obviously does not teach or suggest the present invention.

SUMMARY OF THE INVENTION

Accordingly, it is an object of the present invention to provide an improved method and apparatus for assembling reels.

Another object is to reduce the loss to cable manufacturers, transporters and users from damage and destruction of reels and cables mounted thereon.

Another object is to provide such a method and apparatus which is economical, portable, and convenient to use so that reels can be assembled at any location where it is advantageous.

Another object is to provide such a method and apparatus in which a reel being assembled need only be supported on any convenient, relatively level surface.

Another object is to provide such a method and apparatus which can be utilized in replacing broken portions of reels in the field.

Another object is to provide such an apparatus which can be operated by unskilled labor and without specialized tools.

Further objects and advantages are to provide elements and arrangements thereof in an apparatus for assembling reels which is dependable, durable, and fully effective in accomplishing its intended purpose.

DESCRIPTION OF THE PREFERRED EMBODIMENT

Figure 1:
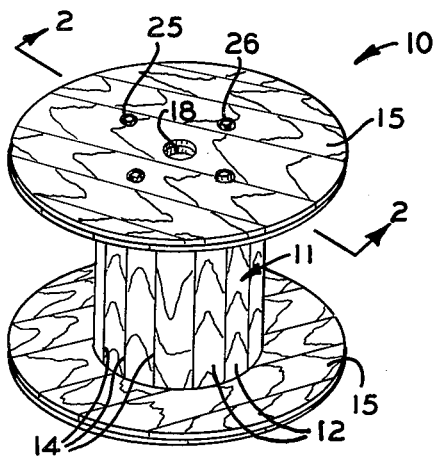
FIG. 1 is a perspective view of a reel as formed by the method and apparatus of the present invention.
Figure 2:
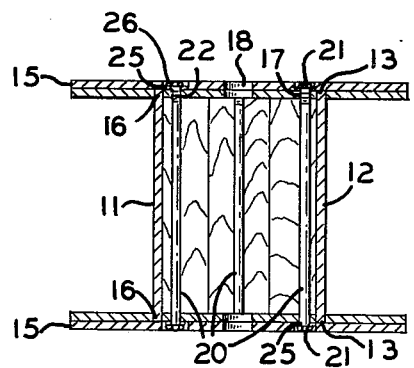
FIG. 2 is a section of the reel taken on line 2—2 of FIG. 1.

Referring more particularly to the drawings, in FIGS. 1 and 2 is shown a representative, assembled reel 10 which, in various stages of assembly, illustrates the method and apparatus of the present invention.

The reel 10 is of well-known construction having a drum 11 formed by a plurality of cylindrically arranged staves 12. Each stave extends axially of the drum and has opposite axial ends 13 and opposite edges 14. The reel 10 has a pair of substantially identical discoidal flanges 15 disposed at axially opposite ends of the drum 11 and substantially coaxially thereof. Each flange has a concentric annular groove 16 facing the opposite flange which is adapted to receive the ends 13 of the staves in fitted engagement. The circumference of the groove is substantially equal to the aggregate widths of the staves 12 so that the staves can be fitted into the grooves in an edge to edge, interengaging relation in a cylindrical assembly to form the drum. Each flange is provided with bores or openings 17 circumferentially spaced about a circle concentrically within the groove and substantially coaxial therewith. When the reel is assembled, corresponding bores of the flanges are disposed in axially aligned pairs for a purpose subsequently to be described. Each flange is also provided with a central circular opening 18 for use in mounting the reel after assembly for rotation on a shaft or axle, not shown. The reel 10 has tie rods 20 individually extended through the pairs of aligned bores 17. The overall length of each rod is substantially equal to the axial length of the reel. Each tie rod has a pair of axially opposite ends 21 which are provided with male screw threads 22. The bores are preferably provided with counterbores. Each tie rod end is inserted through a washer 25 which is, in turn, fitted within the counterbore of the corresponding opening 17. A nut 26 screw threadably engages each tie rod end. As will subsequently be apparent, when the reel is assembled, the nuts are tightened against the washers to draw the flanges together against the staves and thereby clamp the ends 13 of the staves 12 into the annular grooves 16 securing the reel in its assembled condition. It is to be understood that although four tie rods 20 are shown, any desired number with a corresponding number of related elements can be used.

Figure 3:
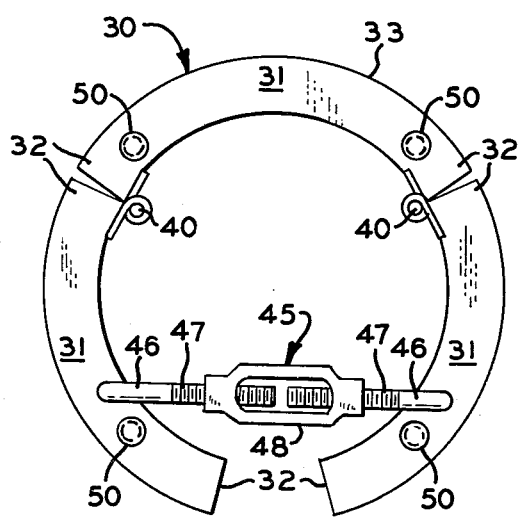
FIG. 3 is an axial view of an inner ring assembly enbodying the principles of the present invention.
Figure 5:
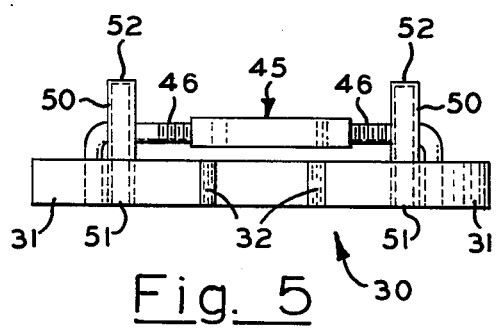
FIG. 5 is an edge view of the inner assembly of FIG. 3.

The apparatus of the present invention includes an inner ring assembly 30, best shown in FIGS. 3 and 5. The assembly includes three inner arcuate members 31 each spanning an arc of substantially one-third of a circle. Each of the members has a pair of opposite ends 32 formed by the extension of a radius of the arc. The members are disposed in a circle with each end of each of the members juxtapositioned to the end of another member forming an inner hoop 33. The members are dimensioned so that the external diameter of the hoop is substantially equal to the internal diameter of the drum 11. Although three arcuate members are utilized in the depicted embodiment of the present invention, it is to be understood that any other suitable number of arcuate members can be utilized.

The inner assembly 30 includes a pair of hinges 40 mounted internally of the hoop 33 and interconnecting two of the juxtapositioned pairs of ends 32 of the arcuate members 31. Circumferentially of the hoop, the hinges are disposed so that their pivotal axes extend substantially parallel to the axis of the hoop at the locations where said ends are juxtapositioned. The members thus move pivotally relative to each other in the plane of the hoop so as to contract the hoop from its largest diameter.

The two arcuate members 31 whose juxtapositioned ends 32 are not interconnected by a hinge 40 are connected by a turnbuckle 45. The turnbuckle has a pair of rods 46 each having an end individually pivotally connected to one of said arcuate members adjacent to the juxtapositioned ends thereof. The rods extend toward each other along a common axis joining their respective pivotally connected ends to individual screw threaded ends 47 disposed in spaced relation within the hoop. One of these screw threaded ends is provided with external right-hand screw threads and the other is provided with external left-hand screw threads. The turnbuckle is provided with an internally screw threaded member 48 which screw threadably engages both of said screw threaded ends so as to interconnect the rods.

The inner ring assembly 30 is provided with four tubular members or tubes 50 corresponding to the four tie rods 20 and mounted on the arcuate members. The tubes are disposed in a circle and circumferentially spaced thereabout in positions corresponding to the positions of the bores 17 in the flanges 15. The tubes are cylindrical, having individual central bores whose axes extend substantially perpendicular to the plane of the hoop 33. Each tube extends through its respective arcuate member and has an open end approximately flush with one of the axially disposed sides of said member. Each tube extends from said open end through the member to a closed end 52 spaced axially from the member. The internal diameter of the tubes is such that they are slidably fitted to receive their respective tie rods 20. The closed ends serve as stops for the tie rods when the rods are inserted in the tubes. The length of the tubes is somewhat greater than the axial distance between an end 21 of one of the tie rods and the groove 16 of the corresponding flange when the reel 10 is assembled.

Figure 4:
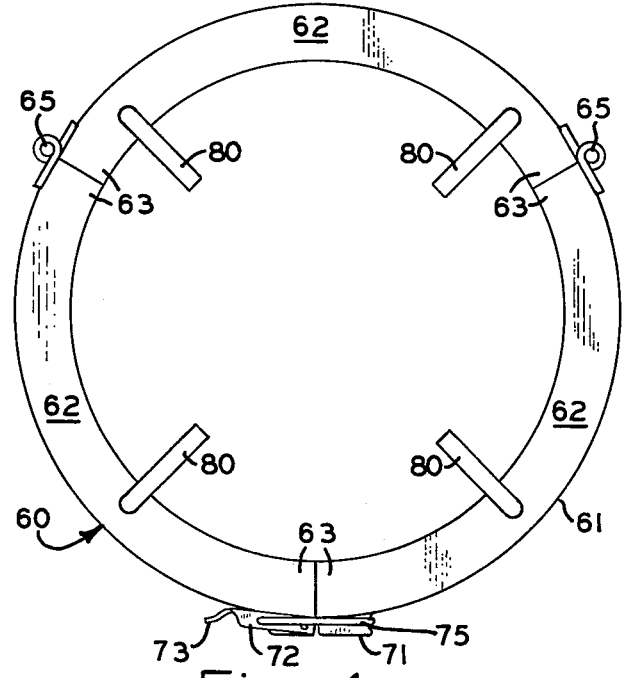
FIG. 4 is an axial view of an outer ring assembly embodying the principles of the present invention.
Figure 6:
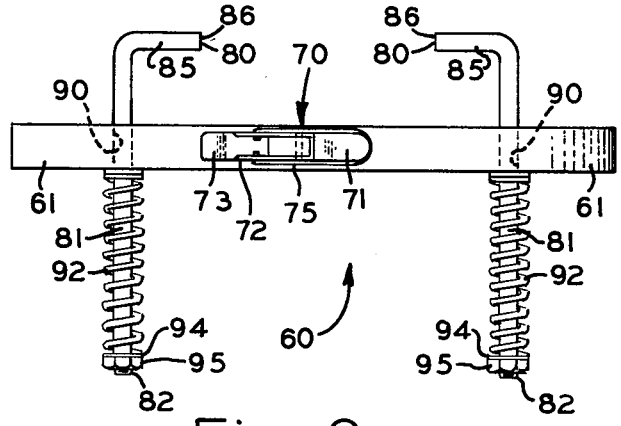
FIG. 6 is an edge view of the outer assembly of FIG. 4.

An outer ring assembly 60 is best shown in FIGS. 4 and 6. The assembly includes an outer hoop 61 having an internal diameter substantially equal to the exterior diameter of the drum 11. This hoop is formed by three outer arcuate members 62. These members are disposed in a manner similar to the arcuate members 31 forming the hoop 33 of the inner ring assembly 30. The outer members have juxtapositioned opposite ends 63 and are connected by two hinges 65 having pivotal axes extending parallel to the axis of the hoop for pivotal movement of the members relative to each other in the plane of the hoop. The hinges of the outer hoop are mounted externally of the hoop on their respective arcuate members. Relative pivotal movement of these outer hoop members, therefore, provides for expansion of the hoop from its smallest diameter. The outer ring assembly 60 includes a latch 70 mounted on and releasable interconnecting the pair of ends 63 of the arcuate members 62 not connected by the hinges. The latch is of a well-known type having a lug 71 mounted on one of said ends and projecting radially therefrom. The latch includes a lever 72 pivotally mounted on the other of said ends for movement about an axis extending perpendicular to the plane of the hoop 61. The axis is disposed adjacent to the lug when said ends are juxtapositioned. The lever extends from this axis to a distal end 73. The latch includes a U-shaped member 75 having its open ends pivotally mounted centrally of the lever. The closed end of this member is dimensioned to engage the lug within the "U" when said pair of ends of the arcuate members are juxtapositioned. The latch is so dimensioned and positioned that, when the U-shaped member is engaged with the lug, movement of the distal end of the lever toward the hoop contracts the hoop and prevents its expansion.

The outer ring assembly 60 is provided with four substantially identical hooks 80 approximately equally circumferentially spaced thereabout. Each hook has an elongated, cylindrical vertical arm 81 provided with external screw threads 82 at its lower end. Each hook has an elongated, cylindrical horizontal arm 85 extending at right angles from the upper end of the vertical arm to a distal end 86. The arcuate members 62 are provided with four bores 90 individually related to the hooks. The axes of these bores extend substantially perpendicular to the plane of the hoop 61, and the bores are loosely fitted to the vertical arms of the hooks. The vertical arms extend through their respective bores mounting each hook on its respective arcuate members for rotational movement about the axis of its respective bore and for slidable movement parallel to said axis. Each horizontal arm thus extends substantially at right angles to said axis and parallel to the plane of the hoop. The hooks are mounted so that the horizontal arms are disposed on the same axial side of the hoop. Each vertical arm is provided with a compression spring 92 mounted concentrically thereon oppositely of the hoop from the horizontal arm. The unrestrained length of the spring is approximately half that of the vertical arm. The spring is retained on the vertical arm by a washer 94 and a nut 95 which engages the screw threads 82.

The length of the horizontal arms 85 of the hooks 80 is substantially greater than the difference between the radius of the hoop 61 and the internal radius of the drum 11. The springs 92 and the vertical arms 81 of the hooks are dimensioned and proportioned so that, when the springs engage the hoop without being substantially compressed, the horizontal arms lie approximately in a common plane. In this disposition the arms are spaced axially from the hoop a distance approximately twice the length of the tubes 50 of the inner ring assembly 30. If these arms are drawn a greater distance from the hoop, they are resiliently urged to return toward the hoops by the springs of their respective hooks.

Figure 7:
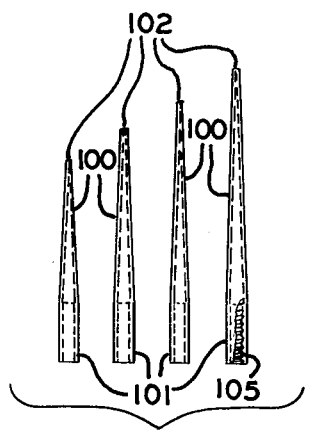
FIG. 7 is a side view of a plurality of lances utilized in the method and apparatus of the present invention.

Four lances 100, individually related to the tie rods 20, are best shown in FIG. 7. Each lance is, preferably, of cylindrical tubular construction and is axially elongated. Each lance has an engaging or mounting axial end 101 and an opposite distal end 102. The lances are, preferably, tapered with their distal ends being smaller in diameter than their mounting ends. The mounting ends are dimensioned to pass freely through the openings 17 provided in the flanges 15 for the tie rods. The mounting end of each lance is provided with internal screw threads 105 which are fitted to the screw threads 22 on the ends 21 of the tie rods so that the lances can be releasably engaged with the tie rod ends. The axial length of each lance is such that, when it is engaged with a tie rod which is in its assembled position in the reel 10, the distal end of the lance extends substantially beyond the position of the corresponding flange 15. The distal end, preferably, should so extend several inches. The length of each lance is different from the length of every other lance so that the distal ends of the lances are spaced progressively different distances from the tie rod ends when the lances are engaged therewith.

OPERATION

The operation of the described embodiment and the method of the present invention are believed now to be clearly apparent and are briefly summarized at this point.

First, a washer 25 and a nut 26 are installed on one end 21 of each of the tie rods 20. The rods are inserted into their respective bores 17 in one of the flanges 15. The rods are then drawn into their assembled positions in which the washers engage the flange oppositely of the groove 16 with the nuts engaging their respective washers. The flange is then rested with the groove upwardly disposed on any convenient, approximately horizontal surface. When so disposed, the tie rods extend upwardly from the flange to the rod ends on which nuts and washers are not installed.

Figure 8:
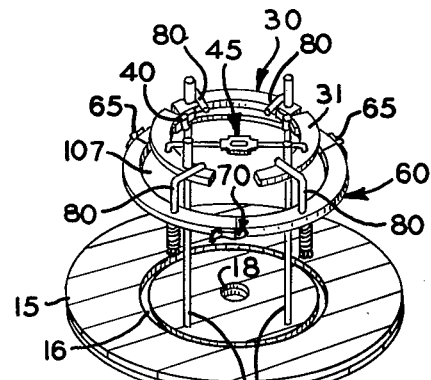
FIG. 8 is a perspective view of the ring assemblies of FIGS. 3 and 4 mounted on a reel of FIG. 1 in an early stage of assembly for use in further assembly of the reel.

The inner ring assembly 30 is then contracted approximately to its minimum diameter by rotation of the turnbuckle 45 so as to draw the ends 32 of the arcuate members 31 connected by the turnbuckle toward each other. The inner ring assembly is next mounted on the upwardly disposed tie rod ends 21 by inserting said ends individually into their respective tubes 50. The assembly is slid downwardly over said ends until the closed ends 52 of the tubes engage said ends and stop the downward movement of the assembly. When so mounted, as shown in FIG. 8, the hoop 33 extends substantially horizontally and parallel to the plane of the flanges 15, and its periphery is substantially concentrically related to the flange and to the position of the interior of the drum 11 when the reel is assembled. The length of the tubes is such that the hoop is supported in a predetermined position adjacent to the upwardly disposed tie rod ends and below the position occupied by the corresponding flange when the reel is assembled.

The outer ring assembly 60 is then partially closed by the latch 70. The latch is only closed sufficiently to maintain the hoop 61 approximately in a circle adjustment. The horizontal arms 85 of the hooks 80 are positioned so as to extend substantially radially inwardly of the hoop 61. The outer assembly is then positioned approximately concentrically of and parallel to the inner ring assembly 30 and is lowered until the horizontal arms engage the inner hoop 33, as shown in FIG. 8. When the arms are so engaged, the outer assembly is supported by and concentrically with the inner assembly with the outer hoop substantially horizontally disposed and resting on the springs 92. When so positioned, the outer hoop is spaced downwardly of the inner hoop defining therebetween a stave receiving channel or annulus 107, best shown in FIG. 8, having substantially the same diameter as the grooves 16 in the flanges 15. The annulus is disposed in spaced juxtaposition to the groove of the lower flange.

The staves 12 are then inserted in succession downwardly through the annulus 107 until the lower ends 13 of the staves are fitted into the groove 16 in the lower of the flanges 15. After each stave is inserted it is maintained in an upright position by engagement of its upper end between the hoops 33 or 61. The width of the annulus can be adjusted for this purpose during insertion of the staves by rotation of the turnbuckle 45 to expand the inner hoop 33.

Before inserting a stave 12 which occupies the position of a horizontal arm 85 of a hook 80, the hook is rotated so that the arm does not extend across the annulus 107 and block the insertion of such stave. When so rotated this hook is disengaged from the inner hoop 33 and does not support the outer assembly 60. However, since there are four hooks, the outer assembly 60 is supported by the other three hooks. After such stave is inserted, the corresponding hook is drawn upwardly against the urging of the spring 92 until the horizontal arm of the hook is above the upper end of the stave. The hook is then turned until its horizontal arm again extends radially inwardly from the outer hoop 61. The hook is released allowing the spring to draw the arm against the end of the stave. At this point the outer assembly is again supported by all of the hooks. Any differences in elevation between the horizontal arms resting on the inner hoop 33 and such arms resting on the ends of the staves are accommodated by the vertical sliding movement of the hooks in the hoop and by compression of the springs.

When all of the staves 12 are installed, the turnbuckle 45 is rotated so as to expand the inner hoop 33 to cause the upper ends of the staves to lie in a circle corresponding to the groove 16 in the upper of the flanges 15. This expansion of the hoop brings the staves into their assembled relation in the drum 11 with their edges 14 engaged. The latch 70 of the outer hoop 61 is now tightened clamping the staves together into edge to edge engagement which resists inward collapse. At this point the outer assembly is supported on the staves by friction created between the outer hoop and the staves during said clamping. The hooks 80 are then rotated so their horizontal arms 85 are extended away from the drum to disengage them from the staves. After each hook is disengaged, it is gravitationally urged to slide downwardly until its arm engages the top of its respective arcuate member 62. In this position the arm is substantially below the assembled position of the upper of the flanges 15. The turnbuckle 45 is then rotated so as to contract the inner hoop 33 and disengage the inner ring assembly 30 from the interior of the drum 11. The inner assembly is then drawn upwardly from the partially assembled reel 10 and the outer assembly and laid to one side for use in a later assembly.

Figure 9:
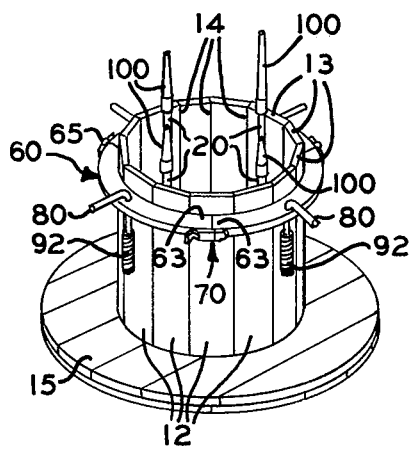
FIG. 9 is a perspective view of the ring assembly of FIG. 4 and the lances of FIG. 7 mounted on a reel at a later stage of assembly than that shown in FIG. 8.
Figure 10:
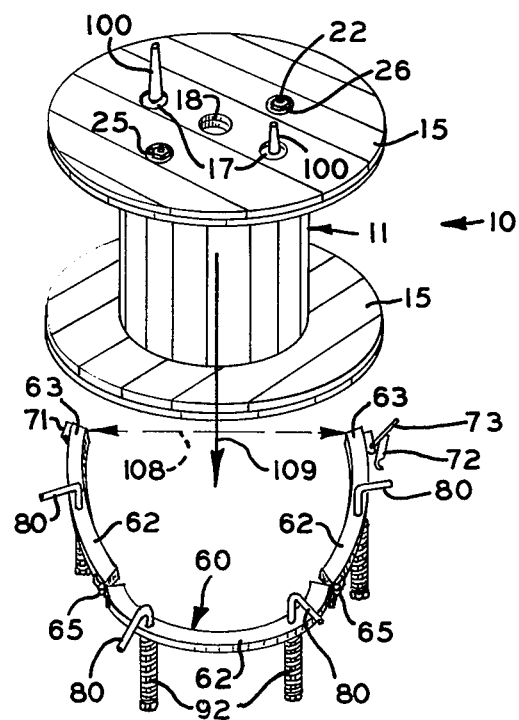
FIG. 10 is a perspective view of a substantially assembled reel with certain of the lances mounted thereon and the ring assembly of FIG. 4 removed from the reel.

At this point in the assembly, the drum 11 is in its assembled position with the tie rods 20 upwardly extending centrally therein. The lances 100 are then individually screw threadably engaged with the upper tie rod ends 21. At this stage of assembly the reel, the outer ring assembly 60, and the lances appear as shown in FIG. 9. Next, the upper flange 15 is lowered toward the drum. As the flange is lowered, the lances are individually threaded or inserted into the openings 17 corresponding to the rods to which the lances are engaged. Since the lances are of different lengths such insertion is greatly facilitated because the lances are inserted in succession as the flange is successively lowered to the elevations of each distal end 102. Such insertion is also facilitated by the tapered form of the lances. When all of the lances are inserted into their respective openings, the upper flange is lowered sufficiently to engage the upwardly disposed ends 13 of the staves 12 into fitted relation within the annular groove 16. The upper flange is then rested on the staves. The lances are now disengaged from the tie rods and put to one side for use with a later assembly. The washers 25 and the nuts 26 of the upper tie rod ends are then installed. The nuts are tightened tensioning the tie rods so as to draw the flanges together and clamp the staves therebetween into their fitted engagement in the grooves. FIG. 10 depicts the reel with two of the lances removed from their respective tie rod ends and the nuts and washers assembled on said ends.

At this point the reel 10 is substantially assembled, however, the drum 11 thereof is still circumscribed by the outer ring assembly 60. This assembly can be removed as soon as sufficient nuts 26 and washers 25 have been installed to clamp the reel together as shown in FIG. 10. This assembly is removed by releasing the latch 70 and pivoting the arcuate members 62 on the hinges 65 so as to form a gap 108 in the hoop between the ends 63 of the members interconnected by the latch. The gap is opened until it is wider than the diameter of the drum. As indicated by the arrow 109, the outer assembly is then withdrawn horizontally from the drum with the drum passing through the gap. The removal of the outer ring assembly is the final operation required in assembling a reel 10 with the apparatus of the present invention.

This apparatus can, as previously described, be utilized to replace a broken flange 15 of a reel 10 which is wound with cable, not shown. Such replacement is generally similar to the initial assembly of a reel. The unbroken flange is first rested on any convenient, approximately horizontal surface. The washers 25 and nuts 26 adjacent to the broken flange are then removed together with any remaining portions of this flange. Since the cable is wound outwardly of the drum 11, the staves cannot fall outwardly of their assembled positions. Therefore, it is not necessary to utilize the outer ring assembly 60 to complete the repair. Usually, the staves 12 will remain clamped in their assembled positions in the drum by tension of the cable. In this event it is not necessary to utilize the inner ring assembly 30. However, if all of the staves are not in position, the inner assembly is employed to support the staves and expand them against the wound cable to form the drum. The inner assembly is then removed.

At this point the assembly of the reel 10 is, in effect, in the stage shown in FIG. 9 in which the inner ring assembly 30 has just been removed from the tie rods 20. However, the cable is performing the clamping function of the outer ring assembly 60. The lances 100 are then engaged with the tie rods. Assembly of the reel is completed in the manner previously described except that, of course, it is not necessary to remove the outer assembly when the reel is assembled.

As can be seen from the foregoing description, the method and apparatus of the present invention can be utilized to assemble a reel 10 at any location which has a substantially level surface large enough to accommodate one of the flanges 15 in a horizontally disposed position. No device is required to support the flanges or the drum during assembly. The ring assemblies 30 and 60 and the lances 100 are easily handled by one man except in extreme sizes. These elements are relatively light in weight, economical to construct, and of limited bulk so that the apparatus of the present invention can be provided wherever and whenever it is desirable to assemble such a reel. Reels of the type described can, therefore, be shipped and stored in a disassembled condition greatly to reduce the costs of shipment and storage. The apparatus of the present invention also makes it economical to reuse and repair reels which previously had to be discarded after one use or after breakage.

Although the invention has been shown and described in what is conceived to be the most practical and preferred method and apparatus, it is recognized that departures may be made therefrom within the scope of the invention, which is not to be limited to the illustrative details disclosed.

Having described my invention, what I claim as new and desire to secure by Letters Patent is:

1. A method of assembling a reel having a pair of substantially circular flanges each having a circular groove concentric thereto and a plurality of bores within the groove with the bores of each flange being correspondingly positioned in their respective flanges, a plurality of staves having opposite ends fitted to the grooves in the flanges in a cylindrical assembly to form a drum, and tie rods having opposite ends receivable in corresponding bores of the flanges to draw the flanges toward each other against the staves comprising A. inserting the tie rods through their respective bores in one flange, B. positioning the one flange in a substantially horizontal attitude with the tie rods upwardly extended therefrom, C. suspending an inner ring assembly of an outer diameter substantially equal to the inside diameter of the circular grooves in the flanges on the upper ends of the tie rods in a plane substantially parallel to the one flange, D. suspending an outer ring assembly of an inside diameter substantially equal to the outside diameter of the circular grooves in the flanges on the inner ring assembly and in substantially parallel downwardly spaced concentric relation thereto defining an annular stave receiving channel therebetween, E. inserting the lower ends of the staves downwardly into the groove of said one flange with the upper ends thereof extended through the channel and with the staves in interengaging cylindrical assembly.

F. removing the inner assembly with the upper ends of the staves upwardly extended from the outer assembly, G. fitting the groove of the other flange downwardly over the upper ends of the staves for rested engagement of said other flange thereon, H. threading the upper ends of the tie rods through their respective bores in said other flange, I. tensioning the tie rods between the flanges to compress the flanges against opposite ends of the staves, and J. removing the outer assembly.

2. An apparatus for assembling a reel having a pair of substantially circular flanges each having a circular groove concentric thereto and a plurality of bores within the groove with the bores of each flange being correspondingly positioned in their respective flanges, and tie rods having opposite ends receivable in corresponding bores of the flanges to draw the flanges toward each other against the staves comprising A. an annular inner ring assembly having an outside diameter substantially equal to the inside diameter of the grooves having bores therethrough positioned in corresponding relation to the bores in the flanges, said bores being adapted to receive respective tie rods extended through the corresponding bores in one of the flanges;

B. means for removably supporting the inner ring assembly on the tie rods substantially concentrically of said one flange and in a plane substantially parallel thereto;

C. an annular outer ring assembly of an inside diameter substantially equal to the outside diameter of the grooves;

D. means for removably supporting the outer ring assembly in circumscribing relation to the tie rods in substantially concentrically spaced relation to the inner ring assembly and in a plane substantially parallel thereto and therewith defining therebetween a stave receiving channel in spaced juxtaposition to the groove in said one flange, the inner circumference of said channel being such in relation to the aggregate width of the staves that when the staves are inserted into the channel and the groove of said one flange in cylindrical assembly to form a drum the staves are in edge to edge engagement resisting inward collapse and the inner ring assembly can be removed for the fitted engagement of the groove of the other flange over the ends of the staves;

E. means for guiding the tie rods into their respective bores of said other flange as the groove of said other flange is fitted over the ends of the staves;

F. means for tensioning the tie rods between the flanges to compress the flanges against opposite ends of the staves; and G. means for releasing the outer ring assembly from the tie rods.

3. An apparatus for assembling a reel or the like having a central drum formed by a plurality of staves extending axially of the drum, each stave having axially opposite ends; a pair of flanges individually engaging the corresponding opposite ends of the staves; and a plurality of rods having opposite axial ends and extending axially through the flanges for drawing the flanges into engagement with the staves, in which the apparatus comprises A. an inner ring assembly including an inner hoop having an external diameter substantially equal to the internal diameter of the drum and having means engaging the corresponding axial ends of the tie rods for supporting the assembly thereon in a predetermined position in which the hoop is disposed in concentric relation within the drum toward the ends of the staves corresponding to said ends of the tie rods; and B. an outer ring assembly including
1. an outer hoop having an internal diameter substantially equal to the external diameter of the drum,
2. means for opening the outer hoop so as to form a gap therein wider than the diameter of the drum and for closing the assembly, and
3. a plurality of circumferentially spaced hooks mounted on the outer hoop for rotation about individual axes substantially parallel to the axis of the hoop, the hooks having individual arms extending at substantially right angles to their respective axes in a substantially common plane axially spaced from the hoop whereby the outer hoop may be supported in circumscribing relation to the tie rods in substantially concentrically spaced relation to the inner hoop and in a plane substantially parallel thereto and therewith defining therebetween a stave receiving channel in spaced juxtaposition to said one flange.

4. The apparatus of claim 3 in which
A. the outer ring assembly includes a plurality of outer arcuate members each having a pair of opposite ends and the members are disposed substantially in a circle to form the outer hoop with each of the ends juxtapositioned to one of the ends of an adjacent member defining a plurality of juxtapositioned pairs of ends,
B. the juxtapositioned ends of one of the pairs are releasably interconnected by a latch, and
C. the juxtapositioned ends of another of the pairs are individually interconnected by a hinge mounted externally of said hoop for relative pivotal movement of the interconnected members about an axis substantially parallel to the axis of said hoop.

5. The apparatus of claim 3 in which each of the hooks is mounted for movement parallel to its axis of rotation and is provided with resilient means urging the arm toward the outer hoop and into said common plane.

6. The apparatus of claim 3 in which the means for supporting the inner ring assembly on the tie rods comprises a plurality of axially extending tubular members individually related to and slidably fitted circumferentially about said rods and having individual internal stops engaging the ends of their respective rods to position said assembly in said predetermined position.

7. The apparatus of claim 3 in which
A. the inner ring assembly includes a plurality of inner arcuate members each having a pair of opposite ends, and the members are disposed substantially in a circle to form the inner hoop with each of the ends juxtapositioned to one of the ends of an adjacent member defining a plurality of juxtapositioned pairs of said ends;
B. the juxtapositioned ends of one of said pairs are interconnected by means for forcing said ends apart so as to expand said hoop; and
C. the juxtapositioned ends of another of said pairs are interconnected by a hinge mounted internally of the hoop for relative pivotal movement of the members interconnected by said hinge about an axis substantially parallel to the axis of said hoop.

8. The apparatus of claim 3 in which the flanges are provided with individual openings for the tie rods and the apparatus includes a plurality of elongated lances dimensioned so as to pass longitudinally through the openings and individually related to the tie rods, each lance having an end releasably engaging its respective tie rod and an opposite distal end axially extended therefrom for guidance of the tie rods into their respective openings.

9. The apparatus of claim 8 in which the lances are dimensioned so that the distal ends thereof individually are spaced progressively different distances from their respective tie rod engaging ends.

10. An apparatus for assembling reels or the like having a pair of substantially identical discoidal flanges each provided with an annular groove and a plurality of openings circumferentially spaced about a circle concentrically within the groove, the flanges being disposed in coaxially spaced relation with the grooves in facing relation with corresponding openings aligned axially of the flanges; a plurality of staves each having opposite ends individually inserted into the grooves so as to define a substantially cylindrical drum substantially coaxial with the flanges; a plurality of elongated tie rods longitudinally extending substantially parallel to the axis of the drum, each tie rod having a pair of opposite axial ends individually extending through corresponding openings in the opposite flanges; and a plurality of devices disposed oppositely of the flanges from the staves and individually engaging each of said ends and the flange adjacent thereto for drawing said flange toward the opposite flange and clamping the staves therebetween into the grooves, in which the apparatus is utilized with one of the flanges horizontally disposed and the tie rods extending upwardly therefrom and comprises
A. an inner ring assembly which includes
1. a plurality of inner arcuate members disposed in a substantially horizontal circle, each member having a pair of opposite ends with each end of each member juxtapositioned to an end of another member to form an inner hoop having an external diameter substantially equal to the internal diameter of the drum,
2. means interconnecting a juxtapositioned pair of the ends for forcing said ends apart and expanding the hoop,
3. means individually interconnecting the balance of the juxtapositioned pairs of ends and providing for relative movement of the members in the plane of the circle, and
4. a plurality of substantially identical tubes individually related to the tie rods and being slidably fitted externally thereof, the tubes being mounted on said arcuate members and circumferentially spaced thereabout in alignment with the rods, each tube extending upwardly from its respective arcuate member to a closed upper end and opening downwardly through the member and having an axial length substantially greater than the distance from the upper ends of the tie rods to the position occupied by the upper flange; and
B. an outer ring assembly which includes
1. a plurality of outer arcuate members disposed in a substantially horizontal circle with each end of each member juxtapositioned to an end of another member to form an outer hoop having an internal diameter substantially equal to the external diameter of the drum,
2. means interconnecting a juxtapositioned pair of the ends for drawing said ends together and contracting the hoop,
3. means individually interconnecting the balance of the juxtapositioned pairs of ends for relative movement of said members in the plane of said circle,
4. a plurality of hooks mounted on the outer arcuate members, circumferentially spaced about said hoop, and extending upwardly therefrom, each hook having at the upper end thereof a substantially horizontal arm having a length substantially greater than the difference between the diameter of said hoop and the internal diameter of the drum, whereby the outer hoop may be supported in circumscribing relation to the tie rods in substantially concentrically spaced relation to the inner hoop and in a plane substantially parallel thereto and therewith defining therebetween a stave receiving channel in spaced juxtaposition to said one flange.

11. The apparatus of claim 10 in which the means for interconnecting and forcing apart the pair of juxtapositioned ends of the inner arcuate members comprises
A. an externally screw threaded rod connected to one of said ends and extending substantially horizontally therefrom toward the other of said ends, and
B. an internally screw threaded member screw threadably engaging said rod and connected to said other of said ends.

12. The apparatus of claim 10 which includes a plurality of elongated, cylindrically tubular lances, individually related to the rods, each lance having an end releasably engaging an end of a tie rod when the longitudinal axes of the lance and the tube are aligned and having a distal end longitudinally spaced from the engaging end a distance such that the distal end extends from the tie rod substantially beyond the position of the flange adjacent to said tie rod end.

13. The apparatus of claim 12 in which each lance is tapered with the engaging end thereof being larger in diameter than the distal end thereof.

* * * * *